United States Patent
Ashida et al.

(10) Patent No.: US 6,524,465 B1
(45) Date of Patent: Feb. 25, 2003

(54) METHOD OF SUPPLYING ELECTRIC CURRENT TO PRESTRESSED CONCRETE

(75) Inventors: Masanobu Ashida, Osaka (JP); Kouichi Ishibashi, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/763,859
(22) PCT Filed: Nov. 17, 1998
(86) PCT No.: PCT/JP98/05166
§ 371 (c)(1), (2), (4) Date: Feb. 28, 2001
(87) PCT Pub. No.: WO00/14361
PCT Pub. Date: Mar. 16, 2000

(30) Foreign Application Priority Data

Sep. 2, 1998 (JP) ............................................. 10-248111

(51) Int. Cl.⁷ ............................................... C04B 41/00
(52) U.S. Cl. ......................... 205/687; 205/704; 205/734
(58) Field of Search ................................ 205/734, 687, 205/704

(56) References Cited

U.S. PATENT DOCUMENTS 5,183,694 A * 2/1993 Webb .......................... 205/734
5,228,959 A * 7/1993 Miller ......................... 205/734
6,056,867 A * 5/2000 Burgher et al. ............. 205/734

FOREIGN PATENT DOCUMENTS

| JP | 6-15792 | 3/1994 |
| JP | 7-286444 | 10/1995 |
| JP | 9-142959 | 6/1997 |

* cited by examiner

Primary Examiner—Arun S. Phasge
(74) Attorney, Agent, or Firm—Oblon, Spivak, McClelland, Maier & Neustadt, P.C.

(57) ABSTRACT

A method of electrochemical treatment of prestressed concrete which comprises supplying a direct current between a steel embedded in the prestressed concrete as a cathode and an anode on the surface or inside of the concrete at a voltage higher than the hydrogen evolution potential, wherein an effective tensile force acting on the PC steel tendon embedded in the concrete is not greater than 80 % of the tensile strength of the PC steel tendon, and a method of electrochemical treatment of prestressed concrete which comprises supplying a direct current between a steel tendon embedded in the prestressed concrete as a cathode and an anode on the surface or inside of the concrete at a voltage higher than the hydrogen evolution potential, wherein the voltage is adjusted to less than the hydrogen evolution potential at least once during electrochemical treatment.

6 Claims, No Drawings

METHOD OF SUPPLYING ELECTRIC CURRENT TO PRESTRESSED CONCRETE

BACKGROUND OF THE INVENTION

1. Technical Field

The present invention relates to a method of electrochemical treatment of prestressed concrete structures reinforced by rebars or PC steel tendons. In particular, it relates to a method of electrochemical treatment for regeneration of carbonated concrete structures having low concrete alkalinities, concrete structures containing chloride ion and concrete structures containing aggregate which can undergo alkali-aggregate reaction in the concrete.

2. Background Art

The combination of concrete having high compressive strength and steel having high tensile strength imparts a good dynamic balance between compressive strength and tensile strength to concrete structures, as in prestressed concrete structures, and therefore is widely used in various important structures, especially in bridges and many huge and long structures such as roads, railroads and warehouses.

Besides, concrete is generally excellent in resistance to the environment such as water, fire and sunlight. Since the high alkalinity of concrete at a pH value of from 11 to 13 allows the steel in it to form a passive film on the surface which protects it from corrosion, concrete structures such as prestressed concrete have been considered as durable and permanent structures.

However, the longevity of concrete structures is now questioned as concrete structures deteriorate in durability due to various factors, though they used to be considered as permanent structures.

Phenomena called carbonation of concrete and chloride attack account for deterioration of concrete structures.

Carbonation is a phenomenon in which calcium hydroxide resulting from hydration of cement reacts with atmospheric carbon dioxide to yield calcium carbonate and accompanied by decrease in the concrete alkalinity from the normal pH value 11–13 due to the carbonate. When the pH value decreases to about 10 at which the steel starts to corrode due to rupture of the passive film on the steel, concrete structures lose the balance of strength and deteriorate in durability drastically.

Such deterioration of concrete structures develops into rusting of the steel in the concrete and breakage of the steel and is a serious problem from both structural and visual aspects.

Meanwhile, at the seaside and the like, sea water splashes onto the concrete surfaces of concrete structures. When the salt in sea water penetrates to the steel inside the concrete through the concrete pores, the chloride ion ruptures the passive film on the steel and hence induces corrosion.

Further, if insufficiently desalinated sea sand is used as aggregate in concrete, the concrete contains a large amount of chlorides from the beginning, and as a result, steel can not form a passive film sufficient to prevent corrosion.

Concrete structures deteriorate in durability with development of cracks on the concrete and corrosion of the steel as mentioned above.

Such deteriorated concrete structures have been repaired mainly by so-called sectional restoration, which comprises "scraping" concrete from rust on the steel or "scraping" cracks or defects on the concrete and then filling new concrete or mortar.

Sectional restoration only repairs visible deteriorations such as rust on steel and cracking and scaling of concrete and is not applicable at all to concrete with unidentifiable deterioration, namely concrete endangered by visibly unrecognizable deterioration which is going on latently.

To remove the primary causes of carbonation of reinforced concrete structures and chloride attack, application of electrochemical repair methods is is closed (JP-A-1-176287 and JP-A-2-302384).

One of these methods comprises supplying direct current continuously between the steel surrounded by carbonated concrete and an electrode which is placed on the concrete surface or surrounded by alkaline concrete with an alkalinity at a pH value of 11 or above and re-alkalinizes detrimentally carbonated concrete to a pH level of 10 or above by migrating alkaline substances such as sodium or potassium hydroxide from the alkaline surroundings.

The other method is useful for chloride-contaminated concrete and removes chloride ions in the concrete from the surface by supplying direct current continuously between the steel embedded in the concrete and an electrode on the surface of the concrete.

However, because these methods use voltage higher than hydrogen evolution, they have the side effect that the water in the concrete voids is electrolyzed into hydrogen gas continuously on the surface of the steel as the cathode.

PC steel tendons, which are usually high tensile steel and kept under high tension in concrete, embrittle metallographically as they absorb and store hydrogen gas in their structure and break due to hydrogen embrittlement. As a result, prestressed concrete structures fail dynamically and eventually collapse. In fact, some collapses of prestressed concreted structures in the past are considered to be attributed to hydrogen embrittlement of PC steel tendons.

Therefore, although electrochemical repair is the most appropriate to repair concrete structures, care has been needed to apply electrochemical repair to prestressed concrete structures so far due to the side effect called hydrogen embrittlement.

In order to prevent hydrogen gas evolution on the cathode, an attempt to supply direct current at a voltage of about 1.0 V or below has been made. However, this repair method can not reform the concrete and only can prevent corrosion of the steel, and this means that it is necessary to supply direct current permanently. Therefore, there is a problem with maintenance and durability of the electrification equipment and with practicability.

DISCLOSURE OF THE INVENTION

Under these circumstances, the present inventors conducted extensive research to solve the above-mentioned problems and have found out that the hydrogen stored in PC steel tendons during electrochemical treatment diffuses quickly on discontinuation of current supply, and therefore that electrochemical repair can be applied to prestressed concrete structures without the worst result, breakage of the PC steel tendons. On the basis of the discovery, the present inventors have accomplished the present invention.

Namely, the present invention provides (1) a method of electrochemical treatment of prestressed concrete which comprises supplying a direct current between a steel tendon embedded in the prestressed concrete as a cathode and an anode on the surface or inside of the concrete at a voltage higher than the hydrogen evolution potential, wherein an effective tensile force acting on the PC steel tendon embedded in the concrete is not greater than 80% of the tensile strength of the PC steel tendon, (2) the method of electrochemical treatment of prestressed concrete according to (1) wherein the effective tensile force is reduced to 80% or below by placing tendons outside of the cross-sections of the concrete to shift part or all of the stress on the PC steel tendon inside the cross-sections of the concrete to the tendons, (3) the method of electrochemical treatment of prestressed concrete according to (1) wherein the effective tensile force is reduced to 80% or below by providing more support points to the prestressed concrete, (4) a method of electrochemical treatment of prestressed concrete which comprises supplying a direct current between a steel tendon embedded in the prestressed concrete as a cathode and an anode on the surface or inside of the concrete at a voltage higher than the hydrogen evolution potential, wherein the voltage is adjusted to less than the hydrogen evolution potential at least once during electrochemical treatment, and then electrochemical treatment is resumed at a voltage not lower than the hydrogen evolution potential, (5) the method of electrochemical treatment of prestressed concrete according to (4) wherein a duration of adjusting the voltage to less than the hydrogen evolution potential during electrification is at least one day, and (6) the method of electrochemical treatment of prestressed concrete according to any one of (1) to (5) wherein direct current is supplied at a current density of from 0.1 to 10 A per 1 m² based on the surface area of the concrete, and the total duration of current supply is at most 6 months.

According to the present invention, prestressed concrete structures having corroded PC steel tendons can be treated electrochemically without being affected by the hydrogen gas generated near the cathode, and the electrochemical treatment exhibits its effect sufficiently. Therefore, the present invention has potential applications in areas relating to recovery from deterioration and repair of carbonated prestressed concrete structures, prestressed concrete structures containing chloride ion and prestressed concrete structures containing aggregate which can undergo alkali-aggregate reaction and is likely to be useful in these areas. Further, it is possible to strengthen prestressed concrete structures by electrochemically introducing various substances into prestressed concrete structures or filling various substances into prestressed concrete structures by electrophoresis.

BEST MODE FOR CARRYING OUT THE INVENTION

Now, the present invention will be described in detail.

In general, hardened concrete contains plenty of calcium hydroxide aqueous solution inside as the pore water, and the pore water acts as an electrolyte to carry electric current when voltage is applied to the concrete. The current depends the resistance inherent to the concrete and the applied voltage. In general, a voltage of at least 5 V, preferably at least 10 V has to be applied to concrete in order to supply direct current necessary to recovery of carbonated prestressed concrete structures and prestressed concrete structures suffering from chloride attack.

During electrochemical treatment, water is electrolyzed on the surface of the PC steel which acts as the cathode as represented by formula (1).

$$2H_2O+2e^-\rightarrow H_2+2OH^- \qquad \text{formula (1)}$$

The hydrogen evolution potential for formula (1) is estimated to be represented by the following equation from the Nernst equation.

$$E=E^0+(RT/nF)\ln(a_O/a_R)=E^0-0.05916\times pH=-0.316-0.05916\times pH \text{ [V]}$$

Therefore, when the pH value of the inside of concrete is about 10.0 to 13.6, E=from −0.908 to −1.121 V, and the absolute value of the hydrogen evolution potential is about 0.9 to 1.1 V.

Therefore, the minimum voltage of 5 V for electrochemical treatment, which is higher than hydrogen evolution in terms of absolute value always induces generation of hydrogen gas near the cathode.

The present invention investigated the effects of hydrogen gas on the PC steel in prestressed concrete under a voltage having an absolute value within a range which allows hydrogen evolution in detail. As a result, they found out that when the effective tensile force acting on the PC steel tendons in prestressed concrete is not greater than 80% of the tensile strength of the PC steel, regeneration can be attained without hydrogen embrittlement by hydrogen gas or with a little temporary hydrogen embrittlement which can be cleared away immediately, and that the hydrogen stored in the PC steel diffuses and decreases to enable safe electrochemical treatment when the voltage is adjusted to less than the hydrogen evolution potential at least once during electrochemical treatment, and then electrochemical treatment is resumed at a voltage not lower than the hydrogen evolution potential. The present invention has been accomplished on the basis of these discoveries. The test method employed to examine PC steel bars for embrittlement by hydrogen which diffuses with time (hereinafter referred to as diffusible hydrogen) comprised casting and curing concrete around PC steel bars kept under tension in a metal counterforce form and then supplying direct current at a current density of from 0.1 to 10 A/m² based on the surface of the concrete. The electrochemical treatment was followed by withdrawal of the PC steel bars, and then by measurement of the stored hydrogen by thermal analysis and the Slow Strain Rate Technique test (=the SSRT test). In an SSRT test, the elongation at breakage, especially the reduction of area, of the PC steel bars closely reflects the influence of hydrogen gas.

As a result, it was found that ① when the effective tensile force acting on the PC steel bars is not greater than 80% of the tensile strength of the PC steel bars, there is no influence on the reduction of area or only a transient influence which allows the reduction of area to recover quickly, in other words, the PC steel bars recover, that ② the amount of diffusible hydrogen stored in the PC steel bars correlates with the product of current density and duration of current supply, that ③ if the stored diffusible hydrogen is less than a certain amount (hereinafter referred to as the critical diffusible hydrogen amount), no influence of hydrogen gas is shown in the SSRT test, and that ④ after interruption of current supply, diffusible hydrogen quickly dissipates from PC steel bars as time passes.

Namely, it has turned out that when prestressed concrete structures are treated electrochemically by supplying a current, 1) there is no need to take the influence of hydrogen into account if the effective tensile force acting on the PC steel tendons is not greater than 80% of the tensile strength of the PC steel tendons, and 2) even if the influence of hydrogen has to be taken into account, the influence of hydrogen gas on the PC steel tendons can be nullified by temporarily reducing the voltage to less than the hydrogen evolution potential during electrochemical treatment before the hydrogen stored in the PC steel reaches the critical diffusible hydrogen amount to dissipate the diffusible hydrogen quickly and then resuming electrochemical treatment at a voltage not lower than the hydrogen evolution potential.

Namely, according to the above-mentioned principle 1), when the effective tensile force acting on the PC steel tendons is greater than 80% of the tensile strength, electrochemical treatment is made possible if the effective tensile force is reduced to 80% or below ① by reinforcing the prestressed concrete structure with out cable or the like, namely by placing tendons outside of the cross-sections of the concrete to shift part or all of the stress on the PC steel inside the cross-sections of the concrete to the tendons, ②  by providing more support points to prestressed concrete structures, or ③ by relieving stresses through ① and ②. Even if it is impossible to reduce the effective tensile force to 80% or below, according to the principle 2), electrochemical treatment is made possible by repeating a duration of current supply at a voltage not lower than the hydrogen generation potential, a duration at a voltage lower than the hydrogen generation potential and a duration of current supply at a voltage not lower than the hydrogen generation potential. Further, needless to say, when the effective tensile force is not greater than 80%, electrochemical treatment can be carried out safely for a longer time. Because the critical diffusible hydrogen amount depends on "the ratio of the effective tensile force to the tensile strength", the critical diffusible hydrogen amount can be determined from an estimate of the ratio even when the PC steel tendons suffer cross-sectional defects by corrosion.

The best approach to a duration at a voltage below the hydrogen generation potential is to interrupt current supply, namely to drop the voltage to zero. Therefore, a duration at a voltage below the hydrogen generation potential is hereafter called "an interruption". Therefore, repetition of a current supply duration, an interruption and a current supply duration is the most appropriate.

In general, PC steel tendons take about from 4 weeks to 10 weeks to stores the same amount of hydrogen as the critical diffusible hydrogen amount, though it varies with the current density and the degree of corrosion of the PC steel tendons. Therefore, it is possible to continue current supply for 10 weeks at the maximum before an interruption for liberation of the hydrogen stored in PC steel tendons, and after dissipation of the diffusible hydrogen, current supply is resumed at a voltage not lower than the hydrogen evolution potential. After the resumption of current supply, current supply is interrupted again to dissipate the hydrogen before the hydrogen stored in PC steel tendons reaches the critical diffusible hydrogen amount.

The maximum duration of current supply before an interruption is about 10 weeks. However, because a shorter duration of electrification favorably results in less hydrogen storage in PC steel tendons and increased safety, a duration of current supply is preferably 8 weeks or less, more preferably 6 weeks or less.

The definitions of the terms used to describe the present invention are as follows.

① "Steel" means PC steel tendons, rebars, steel frames and the like used for concrete structures and may be placed inside or outside concrete.

② "Prestress" means compressive stress applied intentionally beforehand or afterward for the purpose of counteracting or reducing the tensile stress produced by loading.

③ "Prestressed concrete" is concrete with prestress applied by tendons and generally contains structural materials such as PC steel tendons, rebars and steel frames.

④ "PC steel" means high strength steel used as tendons to apply prestress.

⑤ "Effective tensile force" is the tensile force acting on tendons after application of prestress to concrete and subsequent creeping and drying shrinkage of concrete and relaxation of PC steel tendons.

⑥ "Tensile strength" means pull strength in the case of a PC steel bar or a small diameter deformed PC steel bar, and tensile load in the case of PC steel wire, PC steel strand or PC hard steel wire.

The purpose of interruptions during electrochemical treatment is to quickly liberate and dissipate the diffusible hydrogen stored in PC steel tendons by current supply during interruptions.

Therefore, an interruption has to be long enough to dissipate diffusible hydrogen. Thermal analysis of hydrogen stored in PC steel showed that the duration of an interruption should be at least one day, preferably at least three days. If the duration of an interruption is shorter than one day, more careful investigation is needed because a slight amount of diffusible hydrogen can remain in the PC steel. Even when current supply is interrupted repeatedly, the duration of an interruption should be at least one day.

In the present invention, the current density has to be large enough to remove chloride ion from concrete and allow an alkaline electrolytic solution to penetrate into concrete, and because it is intended for concrete, the amount of current should be expressed in relation to the surface area of the concrete. The current density is usually at least $0.1$ $A/m^2$, preferably at least $0.5$ $A/m^2$, more preferably at least $0.75$ $A/m^2$, based on the surface area of the concrete.

In the present invention, the total duration of current supply is limited to at most 6 months. However, despite of the limited duration of current supply, an excessively large current density is risky. Therefore, the upper limit of current density has to be defined. The upper limit is preferably at most $10$ $A/m^2$, more preferably $7.5$ $A/m_2$, still more preferably at most $5.0$ $A/m^2$.

Now, the anode used in the present invention will be described.

An electrode provided on the surface and/or inside of concrete generally is made anodic (+) and therefore suffers from electrical corrosive attack. In the present invention, although an ordinary rebar or wire net could be used because current is supplied for a relatively short duration of from one day to 6 months, an electrode highly resistant to electric corrosion is preferable in view of efficient reuse of resources. Specifically speaking, ① titanium, a titanium alloy, platinum and/or metals plated therewith, ② carbon in the form of carbon fiber or a carbon rod, and ③ organic polymers having an electric conductivity corresponding to a volume electric resistivity of $10^3$ Ω·cm or below may be mentioned. Titanium and platinum are resistant to electric corrosion, and carbon and organic polymers are also resistant moderately.

Because the volume electric resistivity of concrete is usually about from $10^3$ to $10^4$ Ω·cm, as electrically conductive polymers, those having lower volume electric resistivities, namely lower than $10^3$ Ω·cm, preferably lower than $10^2$ Ω·cm, still more preferably lower than $10$ Ω·cm, are preferable.

In the present invention, an electrolytic solution may be used at the time of electrochemical treatment of concrete. Examples of the solution include aqueous solutions of lithium compounds, aqueous solutions containing lithium compounds and other electrolytes, aqueous solutions of hydroxides or carbonates of alkali metals or alkaline earth metals, aqueous solutions of amines such as guanidine carbonate, hydroxylamine, chloroamine and tetraalkylammonium hydroxides as well as mixtures thereof and aqueous solutions containing buffering agents such as boric acid.

For aqueous solutions of lithium compounds, water-soluble lithium compounds such as lithium acetate, lithium aluminum hydride, lithium borohydride, lithium bromide, lithium hydroxide, lithium iodide, lithium lactate, lithium nitrate, lithium oxalate, lithium perchlorate, lithium phosphate, lithium pyruvate, lithium sulfate, lithium tetraborate, lithium nitrite, lithium carbonate, lithium chloride, lithium citrate, lithium fluoride and lithium hydride may be mentioned.

Now, the present invention will be described in further detail by referring to Examples. However, the present invention is by no means restricted to such specific Examples.

EXAMPLE 1

To investigate hydrogen embrittlement of PC steel tendons, PC steel tendon was laid in a metal counterforce form under tension, and concrete was cast around the PC steel tendon and set. The hardened concrete was cured sufficiently and subjected to electrochemical treatment with direct current. After the direct current was stopped, the PC steel tendon was pulled out of the concrete and subjected to a Slow Strain Rate Technique test (a SSRT test). In the test, the difference between reduction of area of a PC steel tendon just after fabrication ($RA_0$) and after breakage (RA) was calculated to check the PC steel tendon for hydrogen embrittlement. A difference greater than 20 means that "hydrogen embrittlement occurred", a difference greater than 10 and not greater than 20 means that "it is uncertain whether hydrogen embrittlement occurred", and a difference of 10 or below means that "hydrogen embrittlement did not occur".

The reduction of area after breakage (RA) is calculated from the following formula.

$$RA=[1-\text{section area of PC steel on the site of breakage/section area of PC steel before tensile test}] \times 100(\%)$$

The results of the tests under [test conditions 1] on PC steel tendon type C No. 1 and type B No. 1 are shown in Tables 1 and 2, respectively.

The SSRT test was carried out twice on the day of completion of a given period of continuous electrochemical treatment with direct current and 1 month after the electrochemical treatment to investigate recovery of a PC steel tendon after electrochemical treatment.

[Test conditions 1]

Tensile strain rate in SSRT test =$1.6 \times 10^{-5}$/sec

Tensile tester: UH-2000kNA manufactured by Shimadzu Corporation

PC steel tendon: type C No. 1 (Code SBPR 1080/1230) and type B No. 1 (Code SBPR 930/1080) called 13 mm under Item "JIS G 3109 (1994) PC steel bars".

Tensile strength (pull strength)=1230 N/mm² (type C No.1)

Tensile strength (pull strength)=1080 N/mm² (type B No.1)

Electrochemical treatment: current density based on concrete surface area =1 A/m²

Current supply duration: 1–180 days

Effective tensile force: 50–90%

Electrolytic solution: saturated calcium hydroxide aqueous solution

TABLE 1

| Experiment No. | Effective tensile force (%) | Current supply duration (day) | $RA_0$-RA The day of completion of treatment | $RA_0$-RA After 1 month | Remarks |
|---|---|---|---|---|---|
| 1-1 | 60 | 1 | 0 | 0 | Example |
| 1-2 | 60 | 7 | 1 | 0 | Example |
| 1-3 | 60 | 14 | 1 | 0 | Example |
| 1-4 | 60 | 28 | 3 | 0 | Example |
| 1-5 | 60 | 56 | 4 | 0 | Example |
| 1-6 | 60 | 91 | 4 | 0 | Example |
| 1-7 | 60 | 126 | 6 | 1 | Example |
| 1-8 | 60 | 154 | 8 | 1 | Example |
| 1-9 | 60 | 182 | 9 | 1 | Example |
| 1-10 | 50 | 28 | 2 | 0 | Example |
| 1-11 | 70 | 28 | 6 | 2 | Example |
| 1-12 | 75 | 28 | 9 | 3 | Example |

TABLE 1-continued

| Experiment No. | Effective tensile force (%) | Current supply duration (day) | $RA_0$-RA The day of completion of treatment | $RA_0$-RA After 1 month | Remarks |
|---|---|---|---|---|---|
| 1-13 | 80 | 28 | 10 | 4 | Example |
| 1-14 | 83 | 28 | 17 | 17 | Comparative Example |
| 1-15 | 85 | 28 | 21 | 22 | Comparative Example |
| 1-16 | 88 | 28 | 24 | 23 | Comparative Example |
| 1-17 | 90 | 28 | 30 | 29 | Comparative Example |

TABLE 2

| Experiment No. | Effective tensile force (%) | Current supply duration (day) | $RA_0$-RA The day of completion of treatment | $RA_0$-RA After 1 month | Remarks |
|---|---|---|---|---|---|
| 2-1 | 60 | 7 | 0 | 0 | Example |
| 2-2 | 60 | 28 | 2 | 0 | Example |
| 2-3 | 60 | 56 | 3 | 0 | Example |
| 2-4 | 60 | 91 | 4 | 0 | Example |
| 2-5 | 60 | 126 | 4 | 0 | Example |
| 2-6 | 50 | 28 | 0 | 0 | Example |
| 2-7 | 70 | 28 | 3 | 0 | Example |
| 2-8 | 75 | 28 | 5 | 0 | Example |
| 2-9 | 80 | 28 | 8 | 2 | Example |
| 2-10 | 83 | 28 | 13 | 12 | Comparative Example |
| 2-11 | 85 | 28 | 20 | 21 | Comparative Example |
| 2-12 | 88 | 28 | 23 | 24 | Comparative Example |
| 2-13 | 90 | 28 | 28 | 27 | Comparative Example |

EXAMPLE 2

The same metal counterforce form as in Example 1 was used, and electrochemical treatment under [test conditions 2] was followed by the SSRT test. The results are shown in Table 3.

The SSRT test was carried out twice on the day of completion of a given period of continuous electrochemical treatment by direct current and 1 month after the electrochemical treatment to investigate recovery of a PC steel tendon after electrochemical treatment.

[Test Conditions 2]

Tensile strain rate in SSRT test =$1.6 \times 10^{-5}$/sec

PC steel tendon: deformed PC steel wire (Code SWPD1L) called 9 mm under Item "JIS G 3536 (1994) PC steel and PC steel strand"

Tensile strength (tensile load)=90.2 kN

Electrochemical treatment: current density based on concrete surface area =2 A/m²

Current supply duration: 14–56 days
Effective tensile force: 60–85%
Electrolytic solution: saturated calcium hydroxide aqueous solution

TABLE 3

| Experiment No. | Effective tensile force (%) | Current supply duration (day) | $RA_0$-RA The day of completion of treatment | After 1 month | Remarks |
|---|---|---|---|---|---|
| 3-1 | 60 | 14 | 2 | 0 | Example |
| 3-2 | 60 | 28 | 3 | 0 | Example |
| 3-3 | 60 | 56 | 3 | 0 | Example |
| 3-4 | 70 | 28 | 5 | 0 | Example |
| 3-5 | 75 | 28 | 9 | 1 | Example |
| 3-6 | 80 | 28 | 10 | 1 | Example |
| 3-7 | 83 | 28 | 19 | 18 | Comparative Example |
| 3-8 | 85 | 28 | 23 | 23 | Comparative Example |

EXAMPLE 3

The same metal counterforce form as in Example 1 was used, and electrochemical treatment under [test conditions 3] was followed by the SSRT test. The results are shown in Table 4.

The SSRT test was carried out twice on the day of completion of a given period of continuous electrochemical treatment with direct current and 1 month after the electrochemical treatment to investigate recovery of a PC steel tendon after electrochemical treatment.

[Test conditions 3]
Tensile strain rate in SSRT test =$1.6 \times 10^{-5}$/sec
PC steel tendon: type C No. 1 (Code SBPR1080/1230) called 13 mm under Item "JIS G 3109 (1994) PC steel bars".
Tensile strength (pull strength) =1230 N/mm$^2$.
Electrochemical treatment: current density based on concrete surface area =0.1–10 A/m$^2$
Current supply duration: 56 days
Electrolytic solution: saturated calcium hydroxide aqueous solution
Effective tensile force: 60–85%

TABLE 4

| Experiment No. | Effective tensile force (%) | Current supply duration (day) | $RA_0$-RA The day of completion of treatment | After 1 month | Remarks |
|---|---|---|---|---|---|
| 4-1 | 60 | 0.1 | 3 | 0 | Example |
| 4-2 | 60 | 0.5 | 3 | 0 | Example |
| 4-3 | 60 | 0.75 | 4 | 0 | Example |
| 4-4 | 60 | 1 | 4 | 0 | Example |
| 4-5 | 60 | 5 | 4 | 0 | Example |
| 4-6 | 60 | 7.5 | 5 | 0 | Example |
| 4-7 | 60 | 10 | 6 | 0 | Example |
| 4-8 | 70 | 5 | 6 | 1 | Example |
| 4-9 | 80 | 5 | 10 | 2 | Example |
| 4-10 | 85 | 5 | 23 | 22 | Comparative Example |

EXAMPLE 4

The same metal counterforce form as in Example 1 was used, and the test results obtained under [test conditions 4] are shown in Table 5 and Table 6. Table 5 and Table 6 demonstrate that no influence of hydrogen embrittlement was observed in the working examples of the present invention.

The SSRT was carried out on the day of completion of a given period of continuous electrochemical treatment with direct current.

[Test Conditions 4]
Tensile strain rate in SSRT test =$1.6 \times 10^{-5}$/sec
Tensile tester: UH-2000kNA manufactured by Shimadzu Corporation
PC steel tendon: type C No. 1 (Code SBPR1080/1230) called 13 mm under Item "JIS G 3109 (1994) PC steel bars".
Tensile strength (pull strength) =1230 N/mm$^2$
Electrochemical treatment: current density based on concrete surface area =0.8 A/m$^2$
Effective tensile force:.80–95%
Electrolytic solution: saturated calcium hydroxide aqueous solution.
Voltage during interruption: 0 V

TABLE 5

| Experiment No. | Effective tensile force (%) | Electrochemical treatment condition | Total current supply duration (Week) | $RA_0$–RA | Remarks |
|---|---|---|---|---|---|
| 5-1 | 80 | 1 week + 1-week interruption + 1 week | 2 | 0 | Example |
| 5-2 | 80 | 2 weeks + 2-week interruption + 2 weeks | 4 | 2 | Example |
| 5-3 | 80 | 4 weeks + 1-week interruption + 4 weeks | 8 | 5 | Example |
| 5-4 | 80 | 4 weeks + 2-week interruption + 4 weeks | 8 | 4 | Example |
| 5-5 | 80 | 4 weeks + 4-week interruption + 4 weeks | 8 | 3 | Example |
| 5-6 | 80 | 4 weeks + 2-week interruption + 4 weeks + 2-week interruption + 4 weeks | 12 | 4 | Example |
| 5-7 | 80 | 6 weeks + 2-week interruption + 6 weeks | 12 | 6 | Example |
| 5-8 | 80 | 6 weeks + 2-week interruption + 6 weeks + 2-week interruption + 6 weeks | 18 | 7 | Example |
| 5-9 | 80 | 10 weeks + 2-week interruption + 10 weeks | 20 | 8 | Example |
| 5-10 | 80 | 10 weeks + 4-week interruption + 10 weeks | 20 | 7 | Example |

TABLE 5-continued

| Experiment No. | Effective tensile force (%) | Electrochemical treatment condition | Total current supply duration (Week) | $RA_0$–RA | Remarks |
|---|---|---|---|---|---|
| 5-11 | 80 | 10 weeks + 4-week interruption + 10 weeks + 4-week interruption + 10 weeks | 30 | 9 | Example |

(footnote)
The electrochemical treatment condition "4 weeks + 2-week interruption + 4 weeks" indicates that "current was supplied for 4 weeks, then interrupted for 2 weeks and then supplied again for 4 weeks".
The other electrochemical treatment conditions should be interpreted similarly.

TABLE 6

| Experiment No. | Effective tensile force (%) | Electrochemical treatment condition | Total current supply duration (Week) | $RA_0$–RA | Remarks |
|---|---|---|---|---|---|
| 5-12 | 80 | 12 weeks | 12 | 13 | Comparative Example |
| 5-13 | 80 | 20 weeks | 20 | 19 | Comparative Example |
| 5-14 | 80 | 30 weeks | 30 | 25 | Comparative Example |
| 5-15 | 85 | 1 week + 1-week interruption + 1 week | 2 | 1 | Example |
| 5-16 | 85 | 4 weeks + 2-week interruption + 4 weeks | 8 | 6 | Example |
| 5-17 | 85 | 6 weeks + 2-week interruption + 6 weeks | 12 | 8 | Example |
| 5-18 | 85 | 8 weeks | 8 | 13 | Comparative Example |
| 5-19 | 85 | 12 weeks | 12 | 16 | Comparative Example |
| 5-20 | 90 | 1 week + 1-week interruption + 1 week | 2 | 2 | Example |
| 5-21 | 90 | 4 weeks + 2-week interruption + 4 weeks | 8 | 8 | Example |
| 5-22 | 90 | 8 weeks | 8 | 21 | Comparative Example |
| 5-23 | 95 | 1 week + 1-week interruption + 1 week | 2 | 4 | Example |
| 5-24 | 95 | 4 weeks + 2-week interruption + 4 weeks | 8 | 9 | Example |
| 5-25 | 95 | 8 weeks | 8 | 27 | Comparative Example |

(footnote)
The electrochemical treatment condition "4 weeks + 2-week interruption + 4 weeks" indicates that "current was supplied for 4 weeks, then interrupted for 2 weeks and then supplied again for 4 weeks", and the electrochemical treatment condition "12 weeks" indicates that "current was supplied for 12 weeks".
The other electrochemical treatment conditions should be interpreted similarly.

EXAMPLE 5

The same metal counterforce form as in Example 1 was used, and electrochemical treatment under [test conditions 5] was followed by the SSRT test. Then, the SSRT test was carried out. The results are shown in Table 7. Table 7 demonstrates that no influence of hydrogen embrittlement was observed in the working examples of the present invention.

[Test conditions 5]
Tensile strain rate in SSRT test $1.6 \times 10^{-5}$/sec
PC steel tendon: deformed PC steel wire (Code SWPD1L) called 9 mm under Item "JIS G 3536 (1994) PC steel and PC steel strand". Tensile load =74.0 kN.
Electrochemical treatment: current density based on concrete surface area =0.5 A/m²
Effective tensile force: 80%
Electrolytic solution: mixed solution of calcium hydroxide (1 mol/l) and boric acid (0.3 mol/l)
Voltage during interruption: 0.1 V in terms of absolute value

TABLE 7

| Experiment No. | Effective tensile force (%) | Electrochemical treatment condition | Total current supply duration (Week) | $RA_0$–RA | Remarks |
|---|---|---|---|---|---|
| 6-1 | 80 | 4 weeks + 1-week interruption + 4 weeks | 8 | 6 | Example |
| 6-2 | 80 | 6 weeks + 2-week interruption + 6 weeks | 12 | 8 | Example |

TABLE 7-continued

| Experiment No. | Effective tensile force (%) | Electrochemical treatment condition | Total current supply duration (Week) | $RA_0$–RA | Remarks |
|---|---|---|---|---|---|
| 6-3 | 80 | 6 weeks + 1-week interruption + 6 weeks + 2-week interruption + 6 weeks | 18 | 9 | Example |
| 6-4 | 80 | 18 weeks | 18 | 18 | Comparative Example |

(footnote)
The electrochemical treatment condition "4 weeks + 1-week interruption + 4 weeks" indicates that "current was supplied for 4 weeks, then interrupted for 1 week and then supplied again for 4 weeks", and the electrochemical treatment condition "18 weeks" indicates that "current was supplied for 18 weeks".
The other electrochemical treatment conditions should be interpreted similarly.

EXAMPLE 6

To investigate degrees of hydrogen embrittlement and desalination, a PC steel tendon was laid in the same metal counterforce form as in Example 1 under tension, and concrete contained by chloride ions was cast around the PC steel tendon and set. The hardened concrete was cured sufficiently and subjected to electrochemical treatment with direct current. After the direct current was stopped, the PC steel was pulled out and subjected to the Slow Strain Rate Technique test (the SSRT test), and the chloride content of the concrete around the steel was measured for calculation of desalination degree. The results are shown in Table 8. Table 8 demonstrates that in the working examples of the present invention, no influence of hydrogen embrittlement was observed and the electrochemical technique accomplished its purpose of reducing the chloride content of concrete.

[Test conditions 6]

Tensile strain rate in SSRT test =$1.6 \times 10^{-5}$/sec

PC steel tendon: type C No. 1 (Code SBPR1080/1230) called 13 mm under Item "JIS G 3109 (1994) PC steel bars".

Tensile strength (pull strength) =1230 N/mm$^2$

Electrochemical treatment: current density based on concrete surface area =0.1 to 10 A/m$^2$ Effective tensile force: 80%

Electrolytic solution: mixed solution of calcium hydroxide (1 mol/l) and boric acid (0.3 mol/l)

Voltage during interruption: 0 V

EXAMPLE 7

The surface of a concrete flooring slab (width 1 m×length 3 m) made of prestressed concrete was electrochemically treated. The concrete flooring slab was subjected to carbon dioxide gas treatment beforehand for carbonation of the concrete surface (to depths of 10 to 15 mm). The concrete flooring slab was partly stripped to expose the PC steel tendon in it for use as the cathode, and meshed wire with a diameter of 4 mm and a mesh size of 10 cm was fastened to the concrete surface as the anode and sprayed with cellulose pulp fiber containing a sodium carbonate aqueous solution (concentration 1 mol/l).

A direct current was supplied to it at a current density of 1.5 A/m$^2$ based on the concrete surface for 5 days, then interrupted for 3 days, and supplied again for 5 days. During 10 days of current supply in total, sodium carbonate aqueous solution was supplied to the cellulose pulp fiber and allowed to penetrate into the concrete electrically.

After the electrochemical treatment, the meshed wire and the cellulose pulp were removed from the concrete surface, and the carbonation depth in the concrete was measured. As a result, phenolphthalein dyed the concrete red from one side to the other side.

This indicates that the pH of the carbonated portion of the concrete rose and proves re-alkalinization of the concrete.

A following loading test proved that the concrete flooring slab had satisfactory bending properties, and no hydrogen embrittlement of the PC steel tendon was observed.

EXAMPLE 8

A prestressed concrete beam of 25 cm high, 12.5 cm wide and 3 m long was tested. The concrete beam contained 8 kg/cm$^3$ of chlorides which had been added at the time of mixing.

TABLE 8

| Experiment No. | Effective tensile force (%) | current density (A/m$^2$) | Electrochemical treatment condition | $RA_0$–RA | Desalination degree (%) | Remarks |
|---|---|---|---|---|---|---|
| 7-1 | 80 | 0.1 | 6 weeks + 1-week interruption + 6 weeks | 1 | 50 | Example |
| 7-2 | 80 | 0.5 | 4 weeks + 2-week interruption + 4 weeks | 3 | 65 | Example |
| 7-3 | 80 | 0.75 | 4 weeks + 2-week interruption + 4 weeks | 4 | 73 | Example |
| 7-4 | 80 | 1.0 | 4 weeks + 2-week interruption + 4 weeks | 4 | 80 | Example |
| 7-5 | 80 | 2.5 | 4 weeks + 3-week interruption + 4 weeks | 5 | 82 | Example |
| 7-6 | 80 | 5.0 | 3 weeks + 3-week interruption + 3 weeks | 6 | 85 | Example |
| 7-7 | 80 | 7.5 | 2 weeks + 2-week interruption + 2 weeks | 8 | 88 | Example |
| 7-8 | 80 | 10 | 2 weeks + 3-week interruption + 2 weeks | 9 | 90 | Example |

(footnote)
The electrochemical treatment condition "6 weeks + 1-week interruption + 6 weeks" indicates that "current was supplied for 6 weeks, then interrupted for 1 week and then supplied again for 6 weeks".
The other electrochemical treatment conditions should be interpreted similarly.

The concrete beam was partly stripped to expose the PC steel tendon in it as the cathode, and titanium mesh was fastened to the concrete surface as the anode. Then, the concrete beam was soaked in saturated calcium hydroxide aqueous solution.

A direct current was supplied at a current density of 1.0 A/m$^2$ based on the concrete surface for 4 weeks, then interrupted for 2 weeks, and supplied again for 4 weeks. The total current supply duration was 8 weeks.

A loading test on the concrete beam after completion of the electrochemical treatment proved that the concrete beam had satisfactory bending properties and that the PC steel tendon was not embrittled by hydrogen at all. Analysis of the chlorides in the concrete revealed that the chloride content lowered to one fourth of the initial value or less and proved sufficient desalination.

What is claimed is:

1. A method of electrochemical treatment of prestressed concrete which comprises supplying a direct current between a steel embedded in the prestressed concrete as a cathode and an anode on the surface or inside of the concrete at a voltage higher than the hydrogen evolution potential, wherein an effective tensile force acting on the PC steel tendon embedded in the concrete is not greater than about 80% of the tensile strength of the PC steel tendon.

2. The method of electrochemical treatment of prestressed concrete according to claim 1, wherein the effective tensile force is reduced to about 80% or below by placing tendons outside of the cross-sections of the concrete to shift part of all of the stress on the PC steel tendon inside the cross-sections of the concrete to the tendons.

3. The method of electrochemical treatment of prestressed concrete according to claim 1, wherein the effective tensile force is reduced to about 80% or below by providing more support points to the prestressed concrete.

4. A method of electrochemical treatment of prestressed concrete which comprises supplying a direct current between a steel tendon embedded in the prestressed concrete as a cathode and an anode on the surface or inside of the concrete at a voltage higher than the hydrogen evolution potential, wherein an effective tensile force acting on the PC steel tendon embedded in the concrete is not greater than about 80% of the tensile strength of the PC steel tendon and the voltage is adjusted to less than the hydrogen evolution potential at least once during electrochemical treatment, and then electrochemical treatment is resumed at a voltage not lower than the hydrogen evolution potential.

5. The method of electrochemical treatment of prestressed concrete according to claim 4, wherein a duration of adjusting the voltage to less than the hydrogen evolution potential during electrochemical treatment is at least one day.

6. The method of electrochemical treatment of prestressed concrete according to any one of claims 1 to 5, wherein direct current is supplied at a current density of from about 0.1 to 10 A per 1 m$^2$ base on the surface area of the concrete, and the total duration of current supply is at most 6 months.

* * * * *